United States Patent
Kondo et al.

(10) Patent No.: US 12,021,469 B2
(45) Date of Patent: Jun. 25, 2024

(54) ROTATING MACHINE CONTROL DEVICE

(71) Applicant: Mitsubishi Electric Corporation, Tokyo (JP)

(72) Inventors: Shota Kondo, Tokyo (JP); Masahiro Iezawa, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/698,386

(22) Filed: Mar. 18, 2022

(65) Prior Publication Data

US 2022/0368265 A1  Nov. 17, 2022

(30) Foreign Application Priority Data

May 12, 2021  (JP) ................ 2021-080762

(51) Int. Cl.
*H02P 27/08* (2006.01)
*H02P 6/12* (2006.01)

(52) U.S. Cl.
CPC ........... *H02P 27/085* (2013.01); *H02P 6/12* (2013.01)

(58) Field of Classification Search
CPC ................ H02P 27/085; H02P 6/12
USPC ................................ 318/104
See application file for complete search history.

(56) References Cited

U.S. PATENT DOCUMENTS

| | | | | |
|---|---|---|---|---|
| 11,190,122 B2 * | 11/2021 | Ando | ............ | H02P 21/18 |
| 2003/0102884 A1 * | 6/2003 | Sato | ............ | H02P 27/08 |
| | | | | 318/801 |
| 2009/0256509 A1 | 10/2009 | Hiramine | | |

(Continued)

FOREIGN PATENT DOCUMENTS

| JP | 4575547 B2 | 11/2001 |
|---|---|---|
| JP | 2009-254201 A | 10/2009 |

(Continued)

OTHER PUBLICATIONS

JP2011019302A; Kutsuna Masaki et al.; Controller for for Motor Driving System; Toyota Motor Corp; 01/27/20211 (Year: 2011).*

(Continued)

*Primary Examiner* — Gabriel Agared
(74) *Attorney, Agent, or Firm* — Sughrue Mion, PLLC; Richard C. Turner (57) ABSTRACT

In a rotating machine control device which controls an alternating current voltage command which is transmitted to an electric power converter, the alternating current voltage command is generated so that 1f component of the phase current may follow a current command. However, when the rotor position information by a position detecting element which detects the position of the rotor of a rotating machine has an error, an offset component is produced in the phase current. A controller includes an offset compensation part which calculates an offset compensation amount, from a detection result of the detection current so that the offset component of the detection current of the current detecting element may be decreased, and performs an addition or subtraction operation of an offset compensation command to the alternating current voltage command which a voltage command generation part outputs.

9 Claims, 7 Drawing Sheets

(56) References Cited

U.S. PATENT DOCUMENTS

| | | | |
|---|---|---|---|
| 2013/0278200 A1* | 10/2013 | Fujii | H02P 6/10 318/722 |
| 2015/0333681 A1* | 11/2015 | Matsuki | H02P 21/0085 318/400.02 |
| 2021/0114653 A1* | 4/2021 | Tsubaki | B62D 5/0409 |

FOREIGN PATENT DOCUMENTS

| | | | |
|---|---|---|---|
| JP | 2011-19302 A | 1/2011 | |
| JP | 5808210 B2 | 11/2015 | |

OTHER PUBLICATIONS

Office Action dated Jul. 5, 2022 issued by the Japanese Patent Office in Japanese Application No. 2021-080762.

* cited by examiner

ROTATING MACHINE CONTROL DEVICE

FIELD OF THE INVENTION

The present application relates to a rotating machine control device.

BACKGROUND OF THE INVENTION

In a rotating machine control device by PWM (Pulse Width Modulation) control in which an electric power converter is used, it is necessary to suppress vibrations and noises which are caused in a rotating machine. For this purpose, the position of a rotor of a rotating machine is detected with a position detecting element of the rotor, and the determination of a pulse width is conducted based on the position information of the rotor.

However, in a device of this kind, the pulsing motion of 1f component (a component which causes pulsing motions at a frequency once as high as the frequency of a fundamental wave component) is caused in the position information of the rotor, under the influence of the eccentricity and the like of the position detecting element of the rotor.

When the PWM control is performed in this case, an offset component is caused in the phase current of a rotating machine, and the increase of a torque pulsing motion and current peak may be caused. Therefore, it is desirable to control a rotating machine, after the offset component of the phase current is removed. Moreover, in addition to the pulsing motion of 1f component of the position information of the rotor, the pulsing motion of 1f component of a bus line voltage may cause a similar symptom. Or, the similar symptom will be caused, also when voltage errors and the like, which are due to the PWM, are superimposed. In these cases, for example, the symmetry of a voltage pulse from 0 degree to 180 degrees in the voltage phase which is applied to a rotating machine, and a voltage pulse from 180 degrees to 360 degrees is not maintained.

For the reason mentioned above, there is a proposal in the Patent Document 1, in which the drive current of a rotating machine is detected with a current detecting element, the offset component of the drive current is obtained from a current value which is detected with the current detecting element, a voltage command value of the PWM control is compensated by PI (Proportional Integral) control so that the offset component may become zero, and thereby, the offset component of the phase current is removed. Moreover, there is a proposal in the Patent Document 2, in which, among current values which are detected by a current detecting element, low frequency components are extracted with a LPF (Low Pass Filter), and a smaller gain of the PI control is achieved.

CITATION LIST

Patent Literature

Patent Document 1: Japanese Patent No. 4575547
Patent Document 2: Japanese Patent No. 5808210

SUMMARY OF THE INVENTION

Technical Problem

However, in the configurations of the Patent Documents 1 and 2, there is a problem that, when offset errors are superimposed on a current detecting element, the offset component of the phase current due to the current detecting element and the offset component of the phase current due to the 1f pulsing motion of the position information of the rotor cannot be separated. Therefore, a compensation voltage with respect to the offset component of the phase current cannot not be calculated appropriately, and the offset component of the phase current is increased by the compensation voltage, and then, there is a problem that the increase of a torque pulsing motion and current peak is caused. For example, in the case of applications, such as, FA, air conditioners, machine tools, airplanes, railroads, or automobiles, and others, where this rotating machine control device is used, vibrations and noises are caused, when the torque pulsing motion and current peak increases, and there is a problem that the comfort of a user or a worker is spoiled.

The present application discloses the technology for solving the subjects which are mentioned above. The present application aims at offering a rotating machine control device which distinguishes the offset component of the phase current due to the current detecting element, and the offset component of the phase current due to the 1f pulsing motion of the position information of the rotor, when offset errors are superimposed on a current detecting element, and can remove appropriately the offset component of the phase current.

Solution to Problem

A rotating machine control device which is disclosed in the present application comprises an electric power converter which converts direct current voltage of a direct current power supply into alternating current voltage, and outputs to a rotating machine, and a controller which outputs a switching command to the electric power converter, wherein the controller comprises a voltage command generation part which generates an alternating current voltage command to the electric power converter, based on a current value which is supplied from the electric power converter to the rotating machine, and position information of a rotor of the rotating machine, and an offset compensation part which outputs an offset compensation command, based on the current value, and the controller compensates the alternating current voltage command with the offset compensation command, and outputs the switching command.

Advantageous Effects of Invention

According to the rotating machine control device of the present application, the rotating machine control device has an offset compensation part, and thereby, judges whether offset errors are superimposed or not on a current detecting element. When the error is superimposed, the offset compensation voltage which is calculated in an offset compensation amount computing part will be limited, and thereby, the deterioration of the control performance by the offset compensation voltage can be prevented.

DESCRIPTION OF EMBODIMENTS

Embodiment 1

Hereinafter, explanation will be made about the Embodiment 1, based on drawings. It is to be noted that, each of the same numerals in the drawings indicates the same or corresponding portion.

Figure 1:
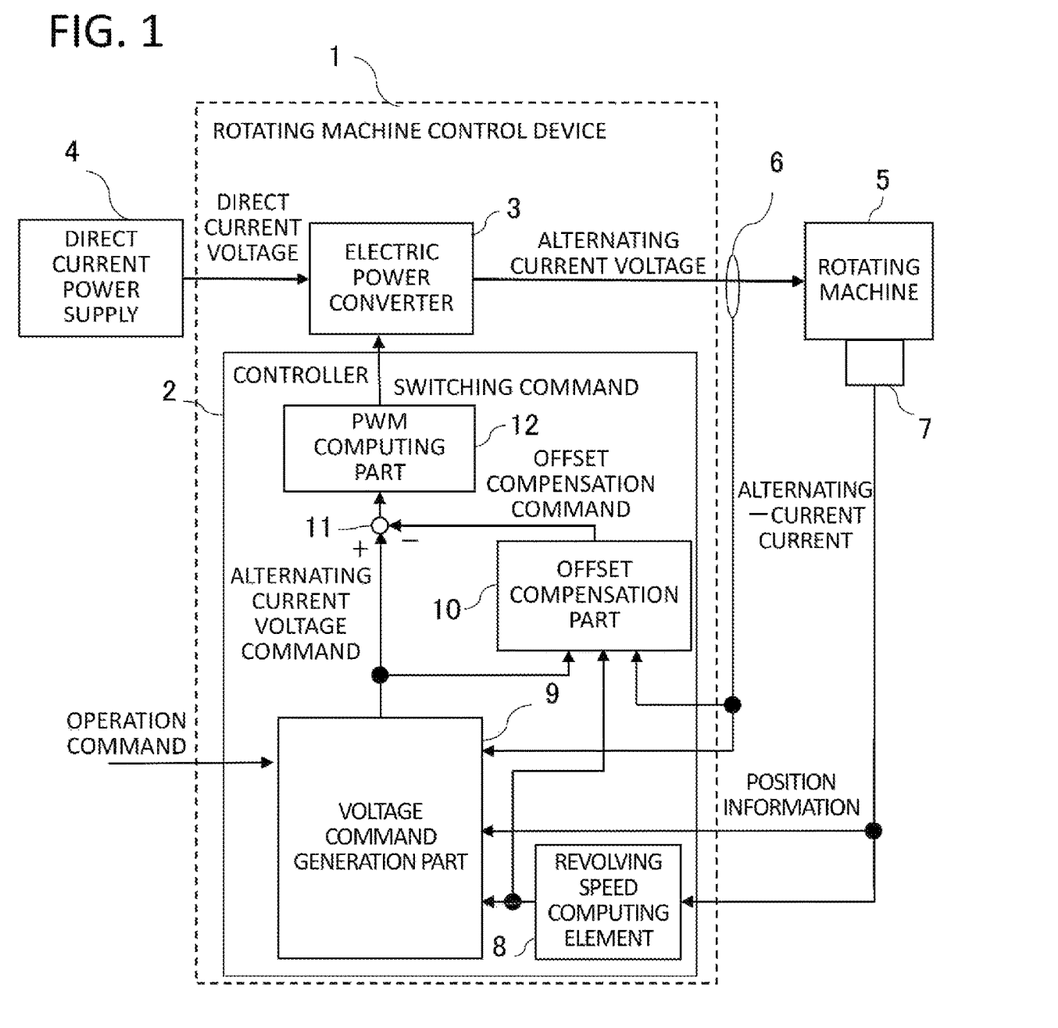
FIG. 1 is a configuration drawing of a rotating machine control device according to the Embodiment 1.

FIG. 1 is a schematic view of a rotating machine control device 1 in accordance with the Embodiment 1. The rotating machine control device 1 is equipped with a controller 2 and an electric power converter 3. The rotating machine control device 1 is provided between a direct current power supply 4 and a rotating machine 5, and a current detecting element 6 detects a current which is supplied from the rotating machine control device 1 to the rotating machine 5. The rotating machine control device 1 is configured so that the current which is supplied to the rotating machine 5 may be controlled, based on the current value which is detected by the current detecting element 6, and the position information from a position detecting element 7 which detects the position of a rotor of the rotating machine 5.

The controller 2 generates a voltage command based on operation commands, such as a command torque and a command revolving speed and the like, the position information from the position detecting element 7, and a current value which is detected with the current detecting element 6, and outputs a switching command for PWM control to the electric power converter 3. The electric power converter 3 is connected by wiring to the direct current power supply 4 and the rotating machine 5. The electric power converter 3 converts the direct current voltage of the direct current power supply 4 into an alternating current voltage, based on a switching command from the controller 2, and applies the alternating current voltage to the rotating machine 5. It is to be noted that, when the revolving speed approaches zero, alternating-current current and alternating-current voltage become direct-current current and direct-current voltage. Moreover, when the offset component is contained, the alternating-current current and alternating-current voltage will contain not only an alternating current component but also a direct current component.

The current detecting element 6 detects a current i u, a current i v, and a current i w of respective phases, which are output to the rotating machine 5. It is to be noted that, the current detecting element 6 may be configured to estimate a current value, by using a current estimate element, instead of detecting a part or all of respective phases. Further, the current detecting element 6 may be configured to detect a current by the bus line side and calculate currents of the respective phases.

The position detecting element 7 is, for example, a resolver, and installed on the rotation axis of the rotating machine 5, and detects the position information θ of a rotor.

It is to be noted that, the position detecting element 7 can employ devices other than a resolver, for example, such as an encoder and the like. Moreover, the position detecting element 7 may have a configuration which is substituted with a position estimate element which estimates the position information θ of a rotor, or a speed detecting element, or a speed estimate element.

In the Embodiment 1, a three-phase synchronous electric motor or a three-phase induction electric motor is assumed as the rotating machine 5. However, the rotating machine 5 may be configured with, for example, a double three-phase winding motor, or motors of other than a three-phase motor, such as a five-phase motor, for example, a wound field synchronous motor. Further, the rotating machine 5 may be configured with synchronous motors, such as a synchronous reluctance motor, a switched reluctance motor, or motors other than induction motors.

The controller 2 is equipped with a revolving speed computing element 8, a voltage command generation part 9, an offset compensation part 10, an adder subtractor element 11, and a PWM computing part 12.

The revolving speed computing element 8 calculates a revolving speed by differentiate-processing the position information of a rotor and passing it through a LPF. The revolving speed may be obtained by a method other than the one using a LPF, and may be substituted with a speed detecting element.

The voltage command generation part 9 generates an alternating current voltage command, based on an operation command from the outside, the position information of the rotor, and an alternating-current current. As the technique for generating this alternating current voltage, generally known technique can be used to obtain this voltage. That is, a three-phase voltage command can be obtained by converting an operation command into a current command, and controlling a current vector on the rotating coordinate (on the d-q coordinate). Moreover, like the constant V-f control, it is allowed to obtain a three-phase voltage command which is in accordance with the command revolving speed. Here, when the pulsing motion of 1f component is produced in the position information of the rotor, an offset component is contained in the alternating current voltage command which the voltage command generation part 9 outputs. Then, the offset component of the phase current is caused by the offset component.

The offset compensation part 10 outputs an offset compensation command, based on the alternating current voltage command which is output from the voltage command generation part 9, the revolving speed which is output from the revolving speed computing element 8, and the value of an alternating-current current which is detected by the current detecting element 6. With the use of an adder subtractor element 11, an offset portion is compensated by subtracting an offset compensation command from the alternating current voltage command. Here, the offset compensation part 10 can remove the offset component of an alternating current voltage command, by the offset compensation command, when the pulsing motion of 1f component is produced in the position information of the rotor. In other words, when the pulsing motion of 1f component is produced in the position information of the rotor, the offset component is removed by conforming the offset component of the alternating current voltage command which the voltage command generation part 9 outputs with the compensation voltage by the offset compensation part 10.

However, when offset errors are superimposed on the output of the current detecting element 6, two offset components will not be in conformity. The alternating current voltage command, which the voltage command generation part 9 outputs, requires the calculation of an offset component, in order to restrain an offset component due to the 1f pulsing motion of the position information of the rotor and an offset error of the current detecting element. However, the offset compensation part 10 requires the calculation of a compensation voltage, in order that the offset component of the alternating-current current may become the value of an offset which is superimposed on the output of the current detecting element 6. Therefore, the voltage command generation part 9 and the offset compensation part 10 will calculate the offset component for their own different purposes. In order to solve such a problem, the offset compensation part 10 is equipped with the function of an offset compensation limit part 14, which will be mentioned later.

It is to be noted that, although the offset compensation part 10 is configured on a fixed coordinate (the uvw coordinate or alpha beta coordinate), the offset compensation part may be configured on the rotating coordinate (on the d-q coordinate). Further, the offset compensation part 10 can accept the configuration in which compensation is performed by multiplication or division, instead of compensating with the adder subtractor element 11. Furthermore, the offset compensation part 10 can accept the configuration in which not only an offset component but also a low pass side component, or the component of other frequency bands are compensated. Moreover, the offset component which is contained in an alternating current voltage command may be not only the pulsing motion of 1f component of the position information of the rotor, but also voltage errors which are due to the PWM and the like, where the symmetry of voltage pulses which are applied to a rotating machine is not maintained.

The PWM computing part 12 compares the alternating current voltage command which is compensated by the output of the offset compensation part 10, with a carrier wave, and outputs a switching command for the PWM control. It is to be noted that, although not illustrated, the frequency of carrier waves may be set at a constant value, regardless of the revolving speed, and may be set to be proportional to the revolving speed. Moreover, the PWM control technique which does not compare with a carrier wave can be allowed to be employed.

Figure 2:
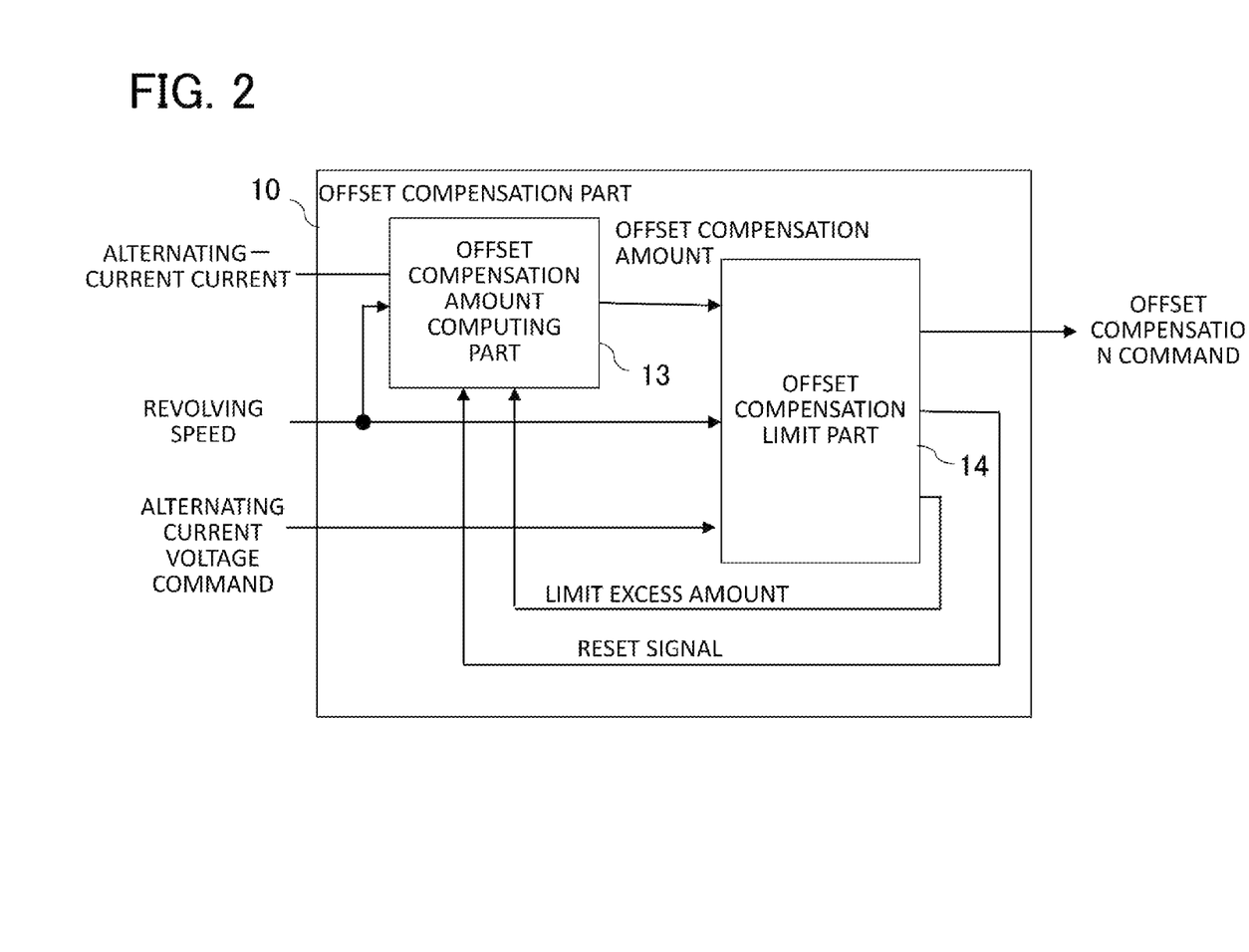
FIG. 2 is a block diagram for showing the configuration of an offset compensation part according to the Embodiment 1.

FIG. 2 shows the configuration of an offset compensation part 10 which is provided in the controller 2 of FIG. 1.

As shown in FIG. 2, the offset compensation part 10 is equipped with an offset compensation amount computing part 13 and an offset compensation limit part 14. The offset compensation amount computing part 13 calculates the offset compensation amount, based on an alternating-current current, a revolving speed of the rotating machine 5, a limit excess amount which will be mentioned later, and a reset signal which will be mentioned later, by any one or more of operation methods, including the proportionality operation, the integration operation, and the differentiation operation. The offset compensation limit part 14 calculates and outputs an offset compensation command, the limit excess amount, and a reset signal, based on the offset compensation amount, the revolving speed, and the alternating current voltage command. It is to be noted that, the offset compensation limit part 14 uses, as the input information, an alternating-current current, a revolving speed, and an alternating current voltage command. However, instead of them, the offset compensation limit part may use a torque, a bus line voltage, a bus line current, a temperature, a control cycle, and the like, and can substitute them. Moreover, the relation between the input and output of the offset compensation part 10 can be calculated beforehand. The offset compensation part 10 may be substituted with the configuration in which the map of the relation is used, or may be used together.

Figure 3:
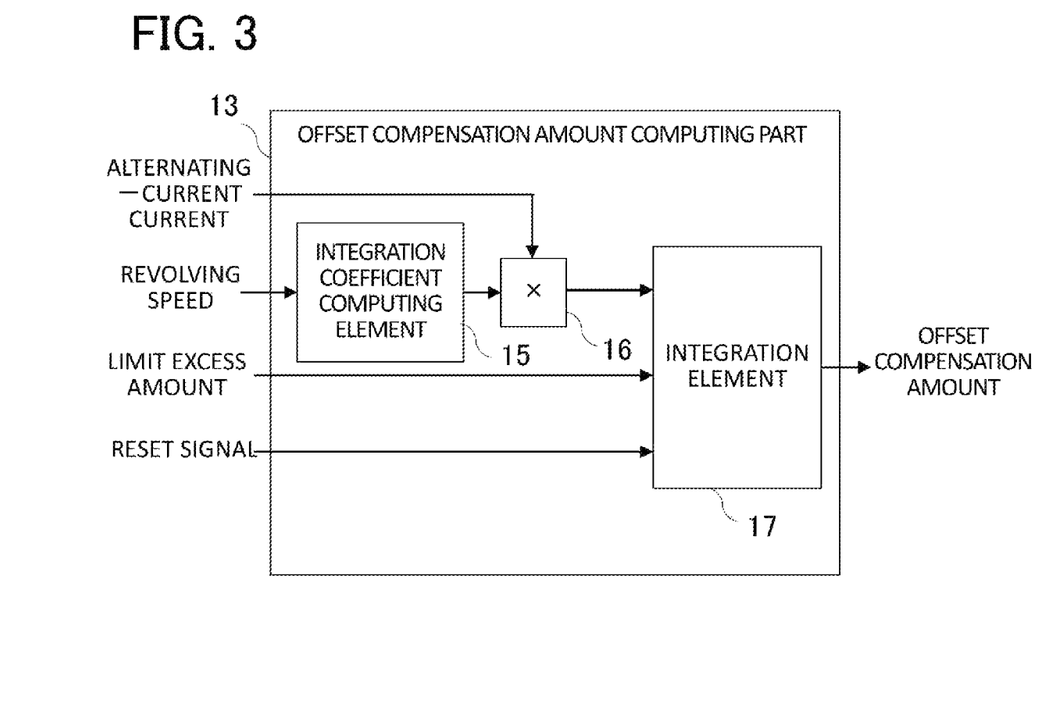
FIG. 3 is a block diagram for showing the part configuration of an offset compensation amount computing part according to the Embodiment 1.

FIG. 3 shows the configuration of the offset compensation amount computing part 13 which is shown in FIG. 2.

As shown in FIG. 3, the offset compensation amount computing part 13 is equipped with an integration coefficient computing element 15, a multiplying element 16, and an integration element 17. The integration coefficient computing element 15 is the one which sets up an integration coefficient used as the control frequency zone for controlling the offset component of the alternating-current current, and changes the gain of a computing element depending on the revolving speed of the rotating machine 5. When the revolving speed is at a low speed, or is around zero, the offset component which is due to the pulsing motion of 1f component of the position information of the rotor cannot be distinguished from the alternating current voltage command for driving. Then, depending on the revolving speed, zero or a very small value is employed as the integration coefficient. By doing in this way, the revolving speed can be prevented from the deterioration in the control performance at a low speed region. The multiplying element 16 multiplies an alternating-current current with the integration coefficient of the integration coefficient computing element 15, and outputs the result to the integration element 17.

The integration element 17 outputs an offset compensation amount based on the output of the multiplying element 16, a limit excess amount, and a reset signal. The integration element 17 usually operates so that the output of the multiplying element 16 may be integration-operated. When the limit excess amount is input, the integration element 17 corrects the integrated value by the integration operation, depending on the limit excess amount. When a reset signal is input, the integration element corrects the integrated value by the integration operation, so that the integrated value may become zero or a reduced value. In this way, the offset compensation amount computing part 13 includes at least one or more integral controls. Thereby, computing can be performed so that there is no steady-state deviation with respect to the desired offset current.

As described in the Patent Documents 1 and 2, the offset component of the phase current is obtained by a LPF, from a detection current, and a voltage command is compensated by the PI control so that the offset component of the phase current may be decreased. In the case of the Embodiment 1 of the present application, unlike the configuration of the Patent Documents 1 and 2, the offset compensation amount computing part 13 is configured to compensate a voltage command by integral control, so that the offset component of the phase current may be decreased directly from a detection current. Therefore, holding the effect of reducing the offset component of the phase current, the offset compensation amount computing part 13 can eliminate a LPF and the PI controlling, and has an effect of reducing the load of calculation greatly. Moreover, since unnecessary LPFs can be removed, the offset compensation amount computing part 13 also has an effect to improve responsiveness.

It is to be noted that, in the Embodiment 1, the rotating machine control device has the configuration in which integral control is carried out so that the offset component of the detection current may be decreased, but the rotating machine control device can accept the configuration in which the proportional control, the differentiation control, or the other type of filter is employed so that the desired control or desired frequency characteristic is achieved. Moreover, the offset compensation amount computing part 13 does not operate only in the uvw coordinate system (the three-phase fixed coordinate system). When configured on the two-phase fixed coordinate (the alpha-beta coordinate) system, the offset compensation amount computing part 13 can reduce the load of calculation to two thirds. Further, the offset compensation amount computing part 13 can accept the configuration in which the two-phase rotating coordinate (the d-q coordinate) system is employed, and the 1f component (the offset component on the fixed coordinate) is removed.

Moreover, the offset compensation amount which decreases the offset component of the phase current, according to a torque, an operating point, such as a revolving speed, or a voltage command, a detection current, a bus line voltage, the PWM technique, and the like, may be calculated beforehand. The offset compensation amount computing part 13 can be substituted with the configuration in which compensation is performed using the map of the offset compensation amount, or can be used together.

Figure 4:
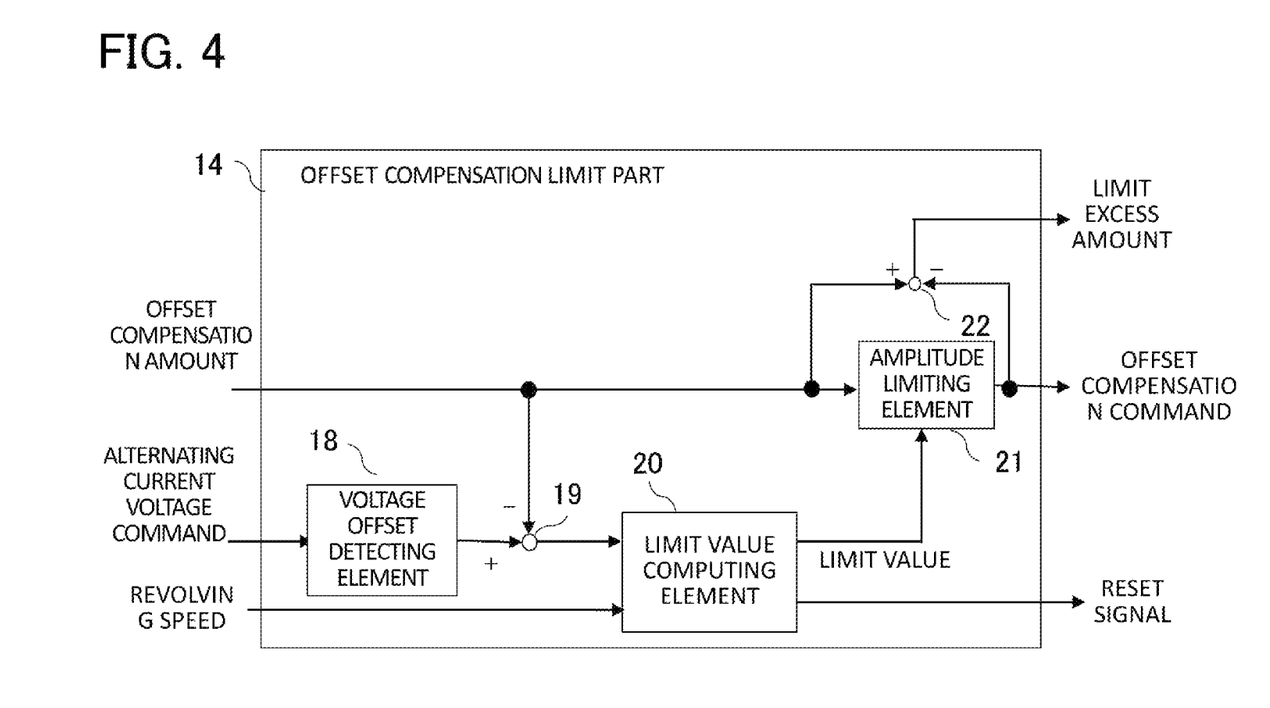
FIG. 4 is a block diagram for showing the configuration of an offset compensation limit part according to the Embodiment 1.

FIG. 4 shows the configuration of the offset compensation limit part 14 which is shown in FIG. 2.

As shown in FIG. 4, the offset compensation limit part 14 is equipped with a voltage offset detecting element 18, an adder subtractor element 19, a limit value computing element 20, an amplitude limiting element 21, and an adder subtractor element 22.

The voltage offset detecting element 18 extracts an offset component from the alternating current voltage command which is output from the voltage command generation part 9, and outputs the offset component to the adder subtractor element 19. Here, the voltage offset detecting element 18 extracts an offset component, using a LPF or the FFT processing and the like. With the adder subtractor element 19, a difference between the output of the voltage offset detecting element 18 and the offset compensation amount is obtained, and the difference is output to the limit value computing element 20. Here, when an offset error is not superimposed on the output of the current detecting element 6, the output of the adder subtractor element 19 becomes a very small value.

The limit value computing element 20 outputs a limit value which is calculated based on the output of the adder subtractor element 19 and the revolving speed of the rotating machine 5, to the amplitude limiting element 21. When the limit value is required to be small, or when the operation of the offset compensation is required to be inactivated, a reset signal is output, at the starting time and stopping time of a rotating machine control device. As for the limit value, when the revolving speed is at a low speed, or is around zero, the offset component which is due to the pulsing motion of 1f component of the position information of the rotor cannot be distinguished from the alternating current voltage command for driving, as mentioned above. Then, the limit value needs to be small. In the case where the revolving speed is 5% or less of the maximum revolving speed, setting will be conducted so that the limit value may be small or may be zero. That is, the offset compensation limit part 14 changes the value of the offset compensation amount, when the relation between the alternating current voltage command and the offset compensation amount is out of the predetermined range.

Also when an offset error is superimposed on the current detecting element 6, the offset compensation amount cannot be calculated correctly. Therefore, a current detection error is estimated from the difference between the offset component of the alternating current voltage command and the offset compensation amount. When the current detection error is 10% or more of the expected maximum current detection error, the limit value employs a small value. In other cases, the limit value is changed depending on the expected maximum value of the 1f component error of the position detecting element 7, and a voltage of the bus line side, and others. When the offset component of the alternating current voltage command and the offset compensation amount are not in agreement, the offset compensation amount cannot be calculated correctly. The reason is omitted here, since explained in the explanation of the offset compensation part 10. Here, the preset value which determines the limit value is configured so as not to cause a steep change and so as to make a gradual change, using a function or a map in order to prevent the fall of transient characteristics. This configuration can prevent the deterioration in the control performance.

It is to be noted that, the preset value, which determines the above-mentioned limit value, is a rough indication for acquiring a general purpose effect, and it is obvious that the preset value is required to be adjusted depending on the composition of product and equipment, and the like.

The amplitude limiting element 21 limits the offset compensation amount, when the offset compensation amount exceeds the limit value which is set up in the limit value computing element 20. When the offset compensation amount does not exceed the limit value, the amplitude limiting element 21 does not change the offset compensation amount, and outputs an offset compensation command. The adder subtractor element 22 calculates the difference between the offset compensation amount and the offset compensation command, and outputs the limit excess amount. Namely, the offset compensation limit part 14 changes the value of the offset compensation amount, when at least any one or more of the operating points of the rotating machine 5, the offset compensation amount, the alternating current voltage command from the voltage command generation part 9, and the direct current voltage of the direct current power supply 4 is the value which is out of the predetermined range. By this operation, when errors are caused in the current detecting element 6, or when the rotation of the rotating machine 5 is at a low speed, the offset compensation can prevent the deterioration in the control performance, rather than at a non-compensation time.

Next, explanation will be made about the action and effect by the rotating machine control device 1, by using FIG. 5 and FIG. 6.

Figure 5:
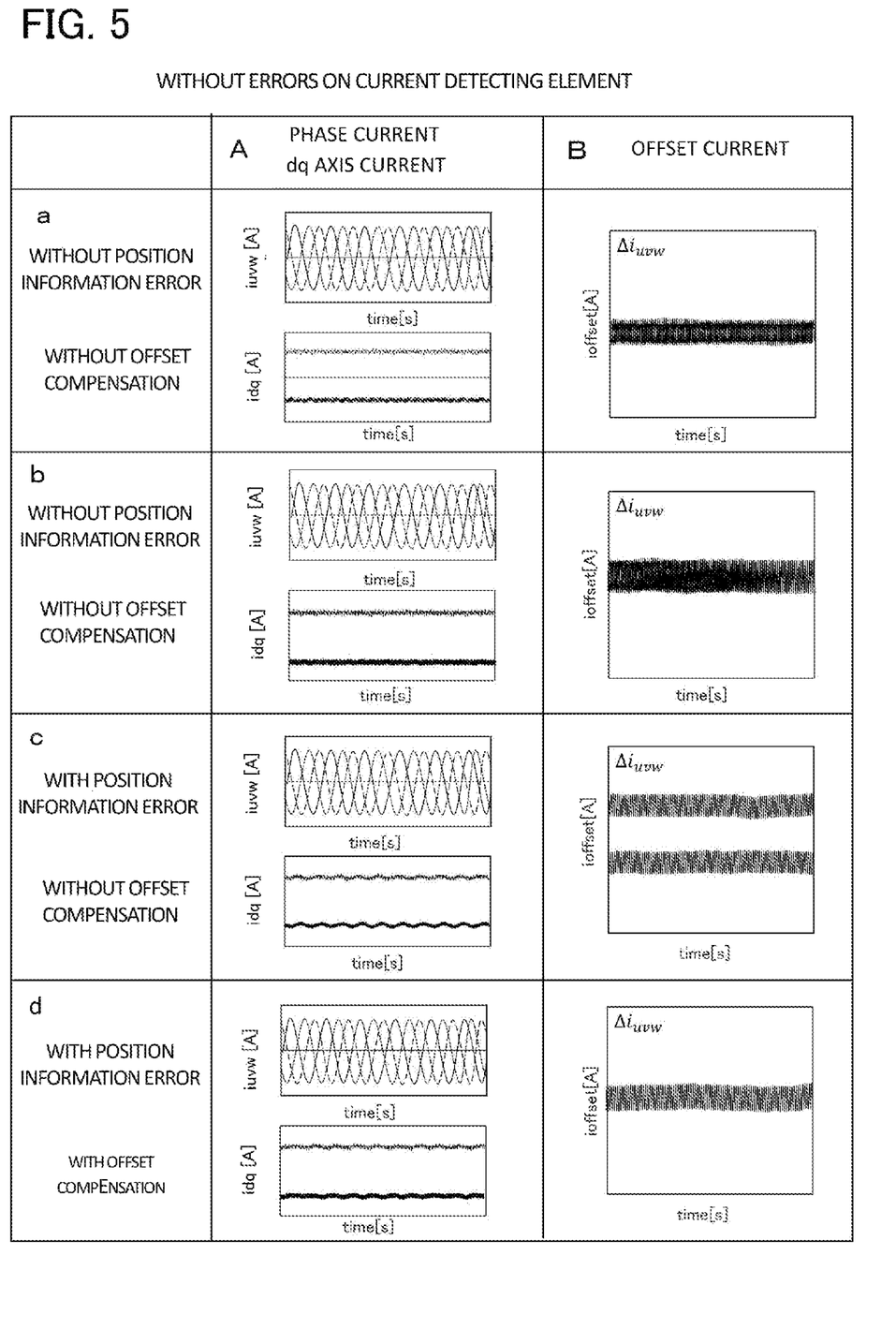
FIG. 5 is an explanatory diagram for showing the action and effect according to the Embodiment 1.
Figure 6:
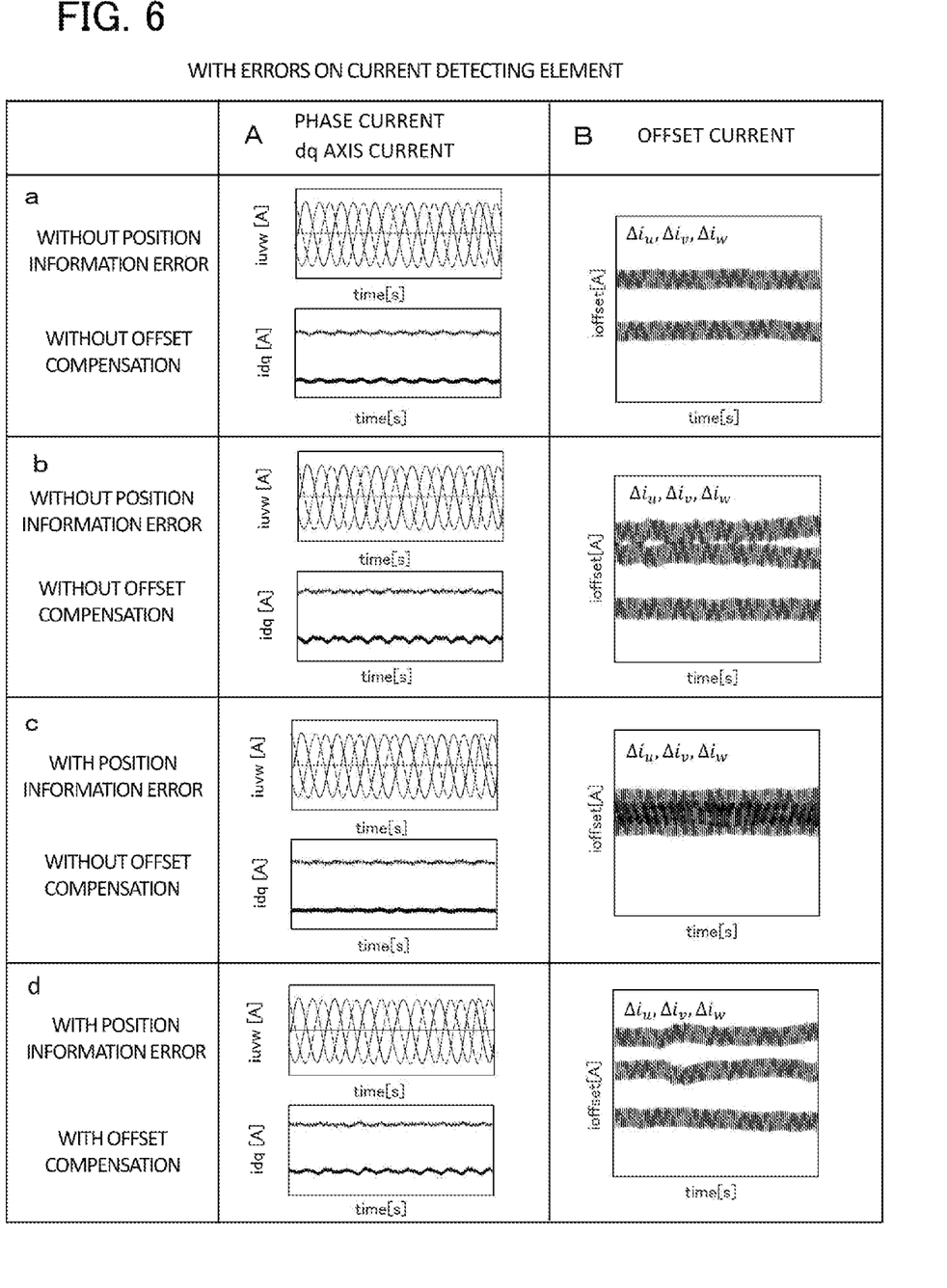
FIG. 6 is an explanatory diagram for showing the action and effect according to the Embodiment 1.

FIG. 5 shows a state in which the offset error is not caused in the detection result of the current detecting element 6, and FIG. 6 shows a state in which the offset error is caused in the detection result of the current detecting element 6.

In each of FIG. 5 and FIG. 6, charts on Line a in the drawings indicate a case where there is no error in the position information of the detection result of the position detecting element 7 (a case without the position information error), and in addition, a case where the offset compensation of the offset compensation part 10 is not in operation (a case without the offset compensation). Charts on Line b indicate a case where there is no error in the position information of the detection result of the position detecting element 7 (a case without the position information error), and in addition, a case where the offset compensation of the offset compensation part 10 is in operation (a case with the offset compensation). Charts on Line c indicate a case where there are errors in the position information of the detection result of the position detecting element 7 (a case with the position information error), and in addition, a case where the offset compensation of the offset compensation part 10 is not in operation (a case without the offset compensation). Charts on Line d indicate a case where there are errors in the position information of the detection result of the position detecting element 7 (a case with the position information error), and in addition, a case where the offset compensation of the offset compensation part 10 is in operation (a case with the offset compensation).

In each of FIG. 5 and FIG. 6, charts on Columns A indicate the phase current and the dq axis current which are in the states of the Line a to the Line d. Charts on Column B indicate the offset current which is in the states of the Line a to the Line d.

In FIG. 5, Δi uvw in the charts means the offset error of the current detecting element 6. By waveforms which are shown in this FIG. 5, it is seen that, when the pulsing motion of 1f component is superimposed on the position information of the rotor, an offset component is caused in the phase current. Further, it is also seen that, even if the pulsing motion of 1f component is superimposed on the position information of the rotor, the offset component of the phase current can be removed, as long as the offset compensation is appropriately performed.

In FIG. 6, Δi u, Δi v, and Δi w in the charts mean the offset error of the current detecting element 6. By these waveforms of FIG. 6, it is seen that, when the offset error is caused in the current detecting element 6, and in addition, the offset compensation is not in operation, the offset component of the phase current becomes smaller in amplitude rather than the offset error of the current detecting element 6, because the voltage command generation part 9 performs control so that the offset error of the current detecting element 6 may be oppressed. When the offset compensation of the offset compensation part 10 is in operation, the offset compensation part 10 performs control so that the offset component of the phase current will follow the offset error of the current detecting element 6. Then, the offset component of the phase current increases, compared with the case where an offset compensation is not performed, and it can be confirmed that the control performance is deteriorated.

In the rotating machine control device according to the present application, it is judged by the offset compensation part 10 whether an offset error is superimposed or not on the current detecting element 6 (the offset compensation limit part 14). When the error is superimposed, the calculated offset compensation voltage is limited (based on the result which is calculated in the offset compensation amount computing part 13). Thereby, it becomes possible to prevent the deterioration in the control performance by the offset compensation voltage.

By the above operations, the rotating machine control device according to the present application can remove the offset component of the phase current appropriately. When the revolving speed is low, and when the offset error is caused in the current detecting element, limiting the offset compensation voltage makes it possible to prevent the increase of the offset component of the phase current, by the offset compensation voltage.

Moreover, unlike the Patent Documents 1 and 2, the rotating machine control device is configured to have the composition which compensates a voltage command by the integral control, so that the offset component of the phase current may directly decrease from the detection current. Then, LPF and PI control are not required, and the load of calculation can be greatly reduced.

It is to be noted that, the Embodiment which is mentioned above is applicable to applications in which a rotating machine control device is used, like FA or air conditioners, machine tools, airplanes, railroads, automobiles, and others.

Figure 7:
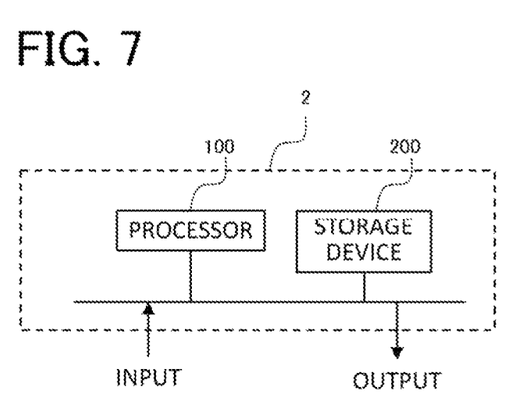
FIG. 7 is a diagram for the hardware configuration of a controller.

It is to be noted that, FIG. 7 shows an example of the hardware of the controller 2, according to the rotating machine control device 1 of the present application. The controller 2 is configured with a processor 100 and a storage device 200. Although the contents of the storage device are not illustrated, the storage device 200 possesses volatile storage units, such as a random access memory, and a non-volatile auxiliary storage unit, such as a flash memory. Moreover, the controller may be provided with the auxiliary storage unit of a hard disk type, instead of a flash memory.

The processor 100 executes a program which is input from the storage device 200, and thereby, performs, for example, the control in the controller 2. In this case, the program is input into the processor 100, through a volatile storage unit from an auxiliary storage unit. Moreover, the processor 100 may output data, like operation results and others, to the volatile storage unit of the storage device 200, and may save the data through the volatile storage unit in the auxiliary storage unit.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment.

It is therefore understood that numerous modifications which have not been exemplified can be devised without departing from the scope of the present application. For example, at least one of the constituent components may be modified, added, or eliminated.

EXPLANATION OF NUMERALS AND SYMBOLS

1 Rotating Machine Control Device: 2 Controller: 3 Electric Power Converter: 4 Direct Current Power Supply: 5 Rotating Machine: 6 Current Detecting Element: 7 Position Detecting Element: 8 Revolving Speed Computing Element: 9 Voltage Command Generation Part: 10 Offset Compensation Part: 11 Adder Subtractor Element: 12 PWM Computing Part: 13 Offset Compensation Amount Computing Part: 14 Offset Compensation Limit Part: 15 Integration Coefficient Computing Element: 16 Multiplying Element: 17 Integration Element: 18 Voltage Offset Detecting element: 19 Adder Subtractor Element: 20 Limit Value Computing Element: 21 Amplitude Limiting Element: 22 Adder Subtractor Element: 100 Processor: 200 Storage Device

What is claimed is:

1. A rotating machine control device, comprising
   an electric power converter which converts direct current voltage of a direct current power supply into alternating current voltage, and outputs to a rotating machine, and
   a controller which outputs a switching command to the electric power converter,
   wherein the controller comprises a voltage command generator which generates an alternating current voltage command to the electric power converter, based on a current value which is supplied from the electric power converter to the rotating machine, and position information of a rotor of the rotating machine, and an offset compensator which outputs an offset compensation command, based on the current value, and
   the controller compensates the alternating current voltage command with the offset compensation command, and outputs the switching command, wherein the offset compensator has an offset compensation amount computer which calculates an offset compensation amount, and an offset compensation limiter for changing the offset compensation amount, depending on a condition, wherein the offset compensation limiter changes the offset compensation amount, when a relation between the alternating current voltage command and the offset compensation amount is out of a range of a first predetermined value.

2. The rotating machine control device according to claim 1,
wherein the offset compensation amount computer comprises a arithmetic which calculates the offset compensation amount, by any one or more of operation methods, including a proportionality operation, an integration operation, and a differentiation operation.

3. The rotating machine control device according to claim 2,
wherein a gain of the arithmetic is changed, depending on a revolving speed of the rotating machine.

4. The rotating machine control device according to claim 2,
wherein the offset compensation amount computer includes at least one or more of integral controls.

5. The rotating machine control device according to claim 1,
wherein the offset compensation amount computer outputs the offset compensation amount which is calculated in advance, based on at least any one or more of an operating point of the rotating machine, the alternating current voltage command from the voltage command generator, and a detection current of the current detector.

6. The rotating machine control device according to claim 1,
wherein the offset compensation limiter changes a value of the offset compensation amount, based on at least one or more of an operating point of the rotating machine, the offset compensation amount, the alternating current voltage command from the voltage command generator, and the direct current voltage of the direct current power supply.

7. The rotating machine control device according to claim 1,
wherein the first predetermined value of the offset compensation limiter is set based on a detection error of the current detector, and
a value equivalent to 10% or more of a maximum value of the detection error is set out of the range of the first predetermined value.

8. A rotating machine control device, comprising
an electric power converter which converts direct current voltage of a direct current power supply into alternating current voltage, and outputs to a rotating machine, and
a controller which outputs a switching command to the electric power converter,
wherein the controller comprises a voltage command generator which generates an alternating current voltage command to the electric power converter, based on a current value which is supplied from the electric power converter to the rotating machine, and position information of a rotor of the rotating machine, and an offset compensator which outputs an offset compensation command, based on the current value, and
the controller compensates the alternating current voltage command with the offset compensation command, and outputs the switching command, wherein the offset compensator has an offset compensation amount computer which calculates an offset compensation amount, and an offset compensation limiter for changing the offset compensation amount, depending on a condition,
wherein the offset compensation limiter changes the offset compensation amount, when a revolving speed of the rotating machine is out of a range of a second predetermined value.

9. The rotating machine control device according to claim 8,
wherein the range of the second predetermined value in the offset compensation limiter is set at a value which is 5% or less of a maximum revolving speed of the rotating machine.

* * * * *